United States Patent
Pavlov et al.

(10) Patent No.: US 6,683,428 B2
(45) Date of Patent: Jan. 27, 2004

(54) METHOD FOR CONTROLLING TORQUE IN A ROTATIONAL SENSORLESS INDUCTION MOTOR CONTROL SYSTEM WITH SPEED AND ROTOR FLUX ESTIMATION

(75) Inventors: Alexei Pavlov, Eindhoven (NL); Alexander T Zaremba, Dearborn Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 26 days.

(21) Appl. No.: 10/060,434

(22) Filed: Jan. 30, 2002

(65) Prior Publication Data

US 2003/0146723 A1 Aug. 7, 2003

(51) Int. Cl.$^7$ .................................................. H02P 7/00
(52) U.S. Cl. ....................... 318/432; 318/254; 318/138; 318/439; 318/812; 318/727
(58) Field of Search ................................ 318/700, 727, 318/798–802, 805, 806, 810, 811, 812, 432, 433, 254, 138, 439

(56) References Cited

U.S. PATENT DOCUMENTS

| | | | |
|---|---|---|---|
| 4,724,373 A | * | 2/1988 | Lipo ........................... 318/805 |
| 5,729,113 A | * | 3/1998 | Jansen et al. ................ 318/799 |
| 5,811,957 A | * | 9/1998 | Bose et al. .................. 318/802 |
| 5,818,192 A | | 10/1998 | Nozari |
| 5,973,474 A | | 10/1999 | Yamamoto |
| 6,014,006 A | | 1/2000 | Stuntz et al. |
| 6,069,467 A | | 5/2000 | Jansen |
| 6,137,258 A | | 10/2000 | Jansen |
| 6,286,473 B1 | | 9/2001 | Zaremba |
| 6,316,904 B1 | * | 11/2001 | Semenov et al. ............ 318/727 |
| 6,414,462 B2 | * | 7/2002 | Chong ......................... 318/701 |
| 6,433,506 B1 | | 8/2002 | Pavlov et al. |

OTHER PUBLICATIONS

"A Novel Induction Machine Flux Observer and its Application to a High Performance AC Drive System", Y. Hori et al, IVAC 10$^{th}$ Triennial World Congress, Munich, FRG, 1987, pp. 363–368.
"Speed Sensorless Field–Oriented Control of Induction Motor with Rotor Resistance Adaptation", H. Kubota et al, IEEE Transactions on Industry Applications, vol. 30, No. 5, Sep./Oct. 1994, pp. 1219–1224.
"A Polar Coordinate–Oriented Method of Identifying Rotor Flux and Speed of Induction Motors without Rotational Transducers", H. Yoo et al, IEEE Transactions on Control Systems Technology, vol. 4, No. 3, May 1996, pp. 230–243.
"AC Induction Motor Control Using an Advanced Flux Observer Design", D. Sun et al, Proceedings of the American Control Conf., Chicago, Illinois, Jun. 2000, pp. 4430–4434.

* cited by examiner

*Primary Examiner*—Rina I. Duda
(74) *Attorney, Agent, or Firm*—Brooks Kushman P.C.; Carlos Hanze

(57) ABSTRACT

A multi-phase induction motor torque control method comprising the steps of establishing an adaptive speed observer and an adaptive flux observer using a speed sensorless control scheme. Rotor speed is estimated based on filtered current and voltage command signals as inputs. A flux observer based on the estimated rotor speed and rotor flux angle is calculated using the estimated rotor flux. Torque is determined following estimation of speed and flux.

4 Claims, 8 Drawing Sheets

METHOD FOR CONTROLLING TORQUE IN A ROTATIONAL SENSORLESS INDUCTION MOTOR CONTROL SYSTEM WITH SPEED AND ROTOR FLUX ESTIMATION

BACKGROUND OF THE INVENTION

1. Field of the Invention

The invention relates to a control system for induction motors and to a method for controlling torque using sensorless direct torque and flux regulation.

2. Background Art

Attempts have been made in the design of controls for induction motors to use speed and flux observers in a system that lacks rotational transducers. Such sensorless control methods make it possible to achieve high dynamic performance of induction motors while achieving low manufacturing costs, high reliability, robustness, and ease of maintenance. For example, a high gain speed observer for use in an induction motor torque control is described in a paper by Khalil et al, entitled "A Torque Controller for Induction Motors Without Rotor Position Sensor", International Conference on Electric Machines, Virgo, Spain, 1996. A paper written by Yoo and Ha, entitled "A Polar Coordinate-Oriented Method of Identifying Rotor Flux and Speed of Induction Motors without Rotational Transducers", IEEE Transactions, Volume 4, No. 3, May 1996, describes a design that uses a separate high gain speed observer with a separate robust rotor flux observer for each of two operating modes, based on the flux natural dynamics. The speed observer and the flux observer for each mode of operation of the motor complement each other in the different modes of operation of the motor.

U.S. Pat. No. 6,316,904, issued Nov. 13, 2001, entitled "Speed and Rotor Time Constant Estimation for Torque Control of an Induction Motor", filed by Zaremba and Semenov, describes a method for estimating rotor resistance using pseudo current and voltage signals. That patent is assigned to the assignee of the present invention.

U.S. Pat. No. 6,433,506, issued Aug. 13, 2002, entitled "Sensorless Control System For Induction Motor Employing Direct Torque And Flux Regulation", filed by Pavlov and Zaremba, discloses a dynamic model for implementing the motor control using stator voltage as input and separately tracks torque and flux.

Kubota and Matsuse, in their paper entitled "Speed Sensorless Field-Oriented Control of Induction Motor with Rotor Resistance Adaptation", IEEE Transactions, Volume 30, No. 5, September/October 1994, describe a method for estimating speed and flux using an adaptive control technique.

A paper by Hori et al, entitled "A Novel Induction Machine Flux Observer and Its Application to a High Performance AC Drive System", IFAC 10th Triennial World Congress, Munich, 1987, describes various design methods for estimating rotor flux in an induction motor controller. The method uses a flux observer that makes it possible to use flux feedback vector control, rather than a so-called slip frequency control, based on a simple control algorithm.

A flux observer utilizing flux dynamics having the ability to track position and velocity error and torque and flux error is described by Sun and Mills in a paper entitled "AC Induction Motor Control Using an Advanced Flux Observer Design", Proceedings of the American Control Conference, Chicago, Ill., June 2000.

SUMMARY OF THE INVENTION

Sensorless control of an induction motor using the method of the invention includes adaptive observers of speed and flux. The induction motor may be used in the hybrid powertrain for an automotive vehicle wherein the induction motor complements an internal combustion engine to establish torque flow to vehicle traction wheels.

The observers are based on a special form of an induction motor model in which stator current dynamics are separated from the unobservable rotor flux. The model is obtained by assuming that rotor speed is a slowly changing variable relative to the flux and current signals.

Using this model with a separated stator current as a reference, a rotor speed identification scheme is designed in the frame of a model reference adaptive system.

In an alternative design, a speed observer is calibrated using a higher order tuning system, thereby improving the tracking of speed transients, although it may be more susceptible to current noise. In direct torque and flux control systems, and also in sensorless strategies with speed estimation, a rotor flux observer is used. Unlike conventional rotor flux observers, which are based on the integration of the rotor flux equation and which is sensitive to system errors, the design of the present invention includes stator current dynamics that are separated from the rotor flux. This allows a definition of rotor flux using an algebraic equation. This equation, which is used to construct the rotor flux observer, does not involve integration. This then greatly reduces the sensitivity of flux estimates to speed systematic error.

In practicing the invention, the method includes measuring current, filtering the current, calculating the voltage, filtering the voltage, estimating stator current and current error as a function of time, estimating and adjusting the speed, estimating the flux and calculating the rotor flux angle, which is used by a torque and flux regulator to calculate rotor torque.

The flux observer of the invention is based on an algebraic relation between measured and filtered voltage and current signals of an induction motor. Unlike known rotor flux observers, the flux observer of the invention does not integrate the rotor speed estimate. It, therefore, works better in the low rotor speed region where accurate speed estimates are difficult.

The speed observer of the invention has improved robustness, compared to indirect field orientation (IFO) systems, with respect to variations in rotor resistance. Such resistance variations can occur as the operating temperature changes.

DETAILED DESCRIPTION OF THE PREFERRED EMBODIMENTS

Figure 1:
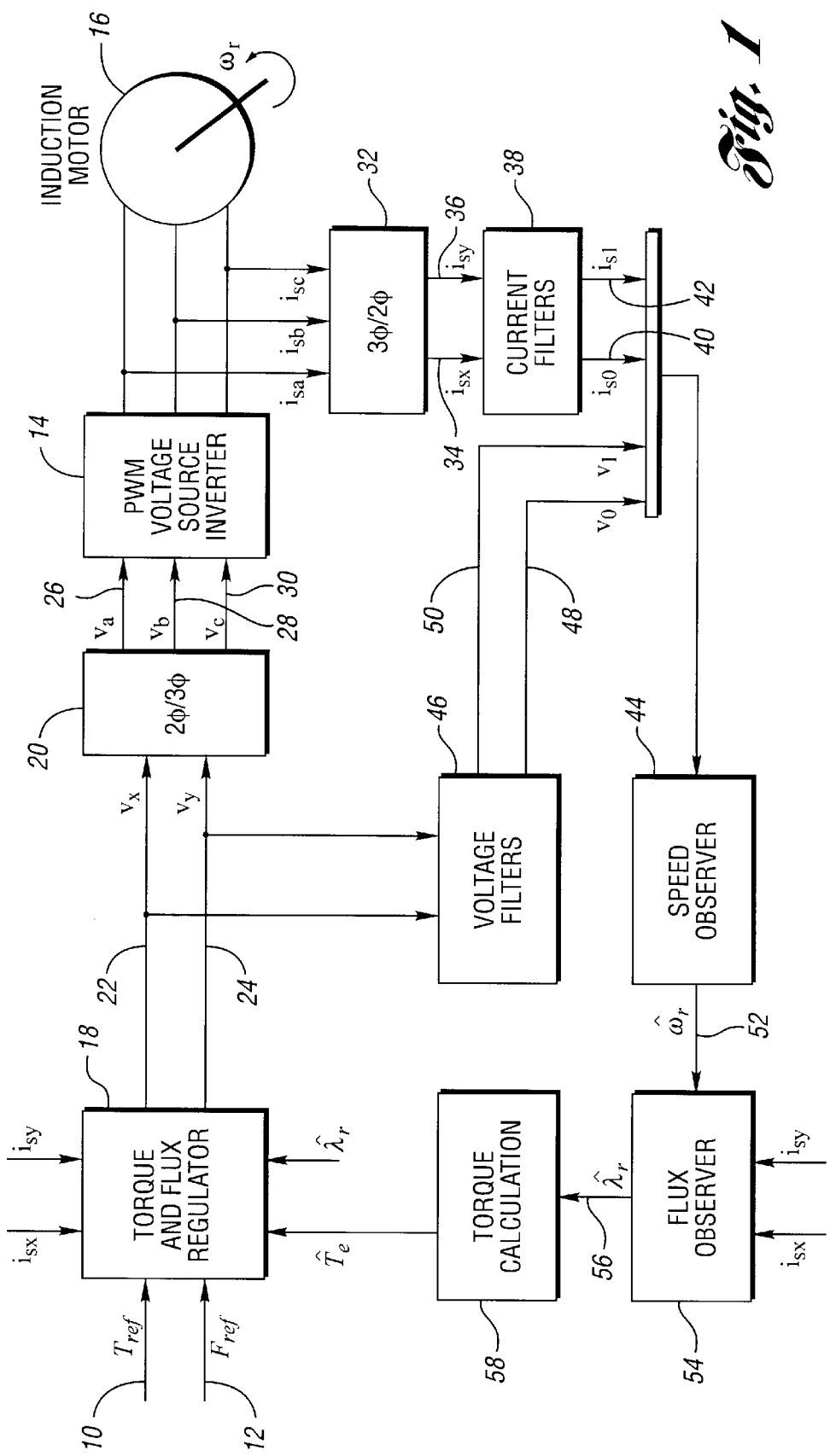
FIG. 1 is a schematic block diagram showing a direct torque and flux regulation scheme for an induction motor with speed and flux estimation.

FIG. 1 is a schematic system diagram for the improved sensorless control system of the invention. The operator of the powertrain commands reference values for torque and flux as shown at 10 and 12 in FIG. 1. A PWM voltage inverter 14 drives a multi-phase induction motor 16 as the torque and flux regulator 18 receives reference torque and flux values. A two-phase to three-phase transformation block 20 converts the x and y axis voltage values 22 and 24 to transformed voltages $V_a$, $V_b$ and $V_c$, as shown at 26, 28 and 30, respectively. A polyphase current, which rotates in the same direction as the rotor of the induction motor 16, creates a rotor torque in accordance with the reference command. Rotation of the polyphase current at a rate less than the rotor speed creates a torque in a direction that opposes rotor rotation. At that time, the motor 16 is in a power generating mode.

Current signals are distributed to phase transformation block 32. These are measured current signals. This generates measured stator currents $I_{sx}$ and $I_{sy}$, as shown at 34 and 36. These currents are filtered at 38. The resulting values for filtered current shown at 40 and 42 are distributed to a speed observer block 44.

A voltage filter block 46 receives the commanded voltages $V_x$ and $V_y$ calculated in the stationary frame and generates output voltages $V_0$ and $V_1$, as shown at 48 and 50. The values for voltages at 48 and 50 and the values for current at 40 and 42 are transferred to the speed observer 44, which estimates the rotational electrical speed of the rotor for the induction motor 16, as will be explained subsequently.

The estimated rotor speed $\hat{\omega}_r$ is distributed as shown at 52 to flux observer 54.

The flux observer will develop a rotor flux value $\hat{\lambda}_r$, as shown at 56, in a manner that will also be described subsequently, using rotor speed and stator current signals $I_{sx}$ and $I_{sy}$, which were developed at 34 and 36.

Rotor flux angle is calculated at the flux observer, and torque is calculated at 58.

Figure 2:
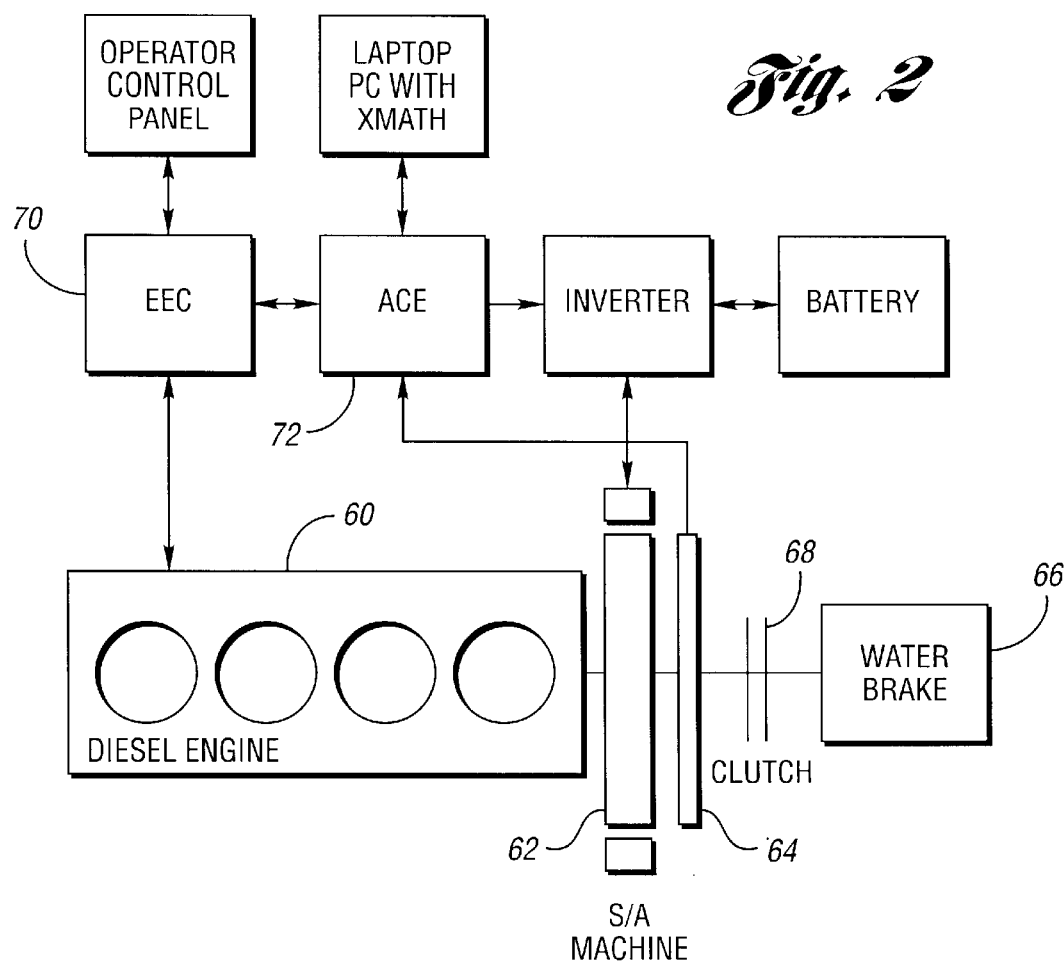
FIG. 2 is a schematic functional diagram of an experimental test setup, which includes an internal combustion engine, such as a diesel engine, an integrated starter-generator, a clutch, a water brake to model an external load, and a rotor position sensor to calibrate the control algorithm.
Figure 3:
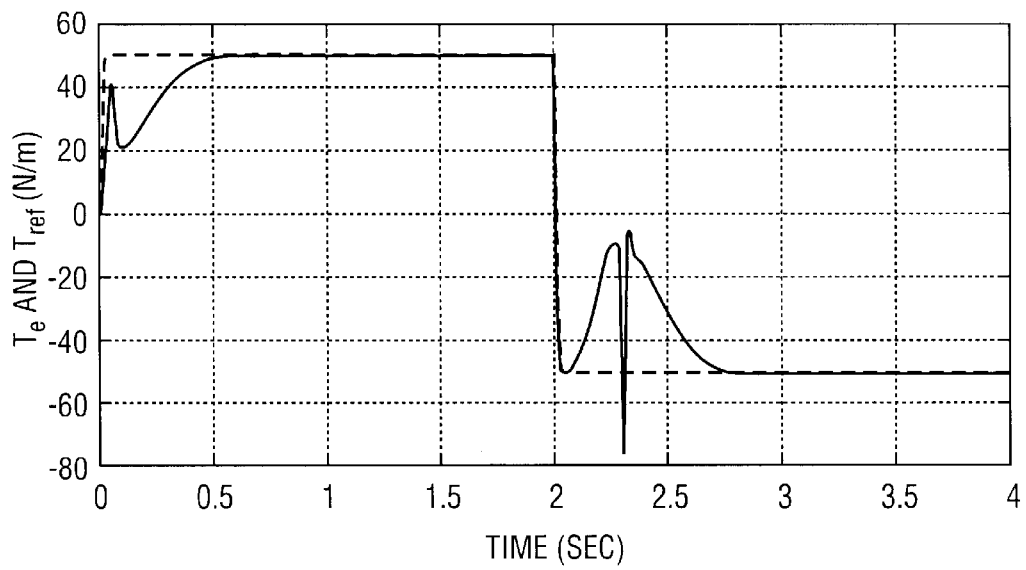
FIG. 3 is a plot showing a reference torque and simulated torque versus time for an induction motor controlled by the improved control method of the invention.
Figure 4:
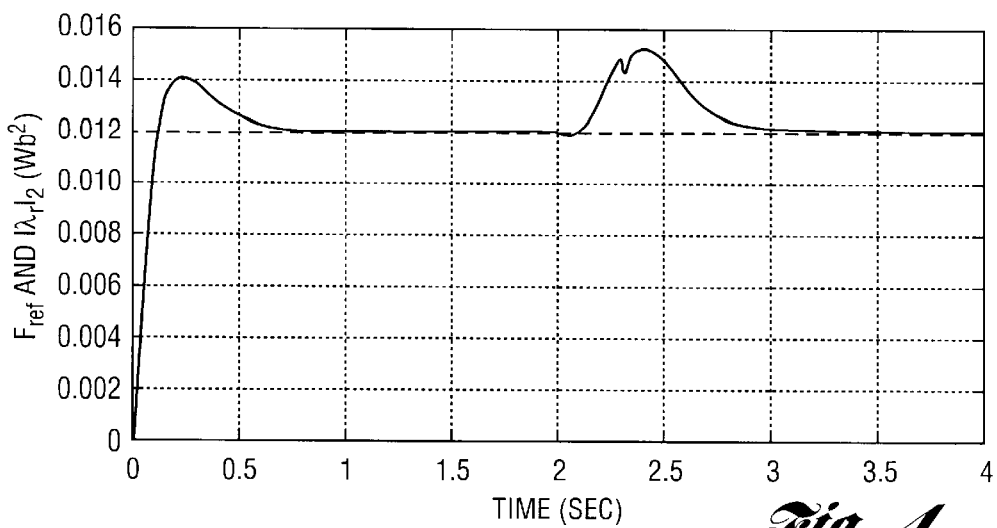
FIG. 4 is a plot of rotor flux magnitude in a speed sensorless direct torque and flux control with rotor resistance change due to heat buildup of ±20%.
Figure 5:
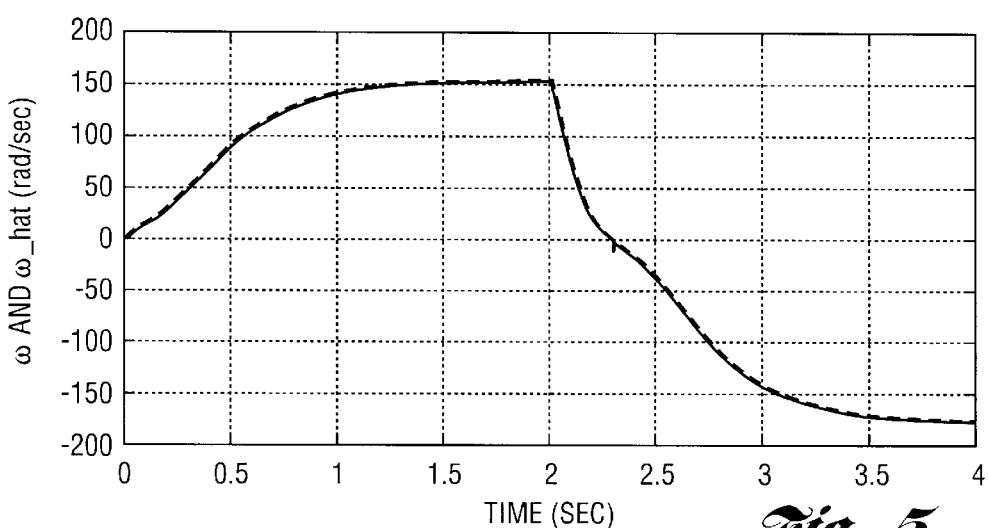
FIG. 5 is a plot of rotor speed and its estimated value.
Figure 6:
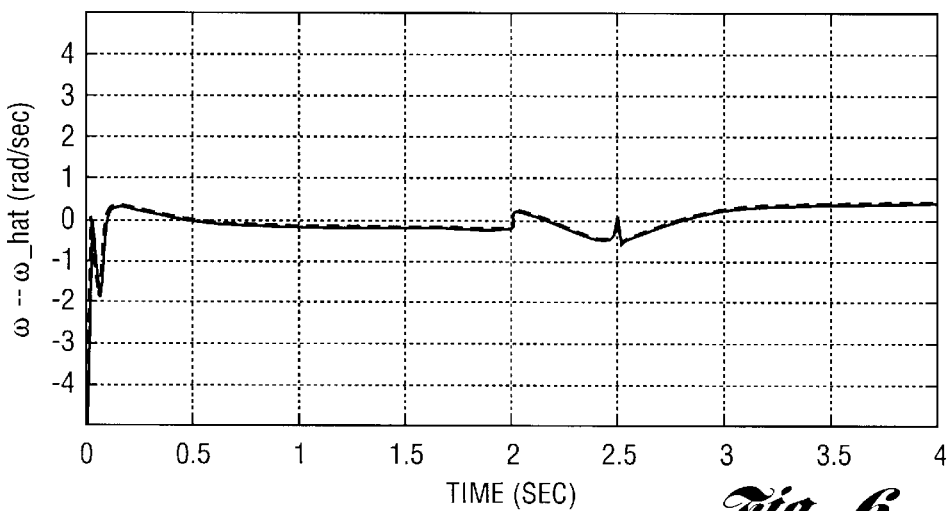
FIG. 6 is a plot of speed estimation error in a speed sensorless direct torque and flux control with rotor resistance change due to heat of ±20%.
Figure 7:
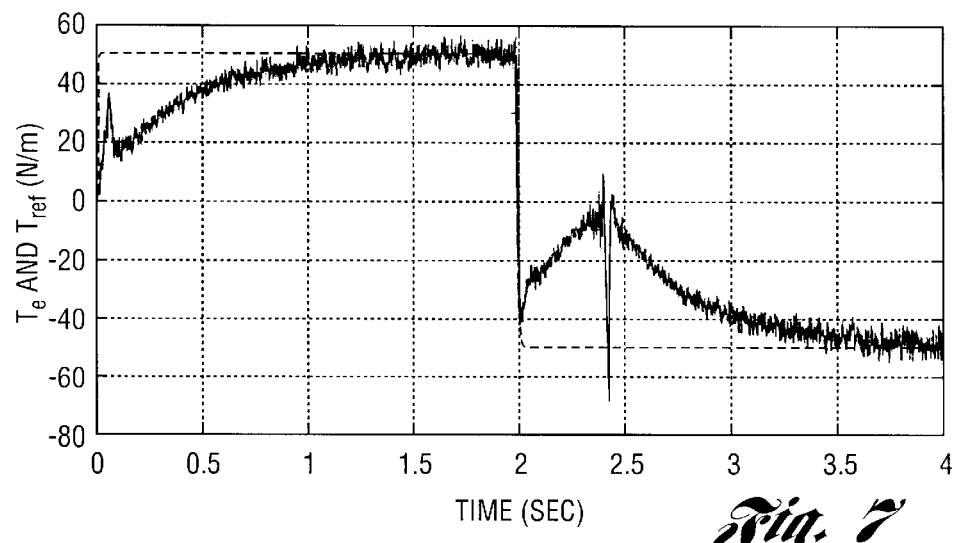
FIG. 7 is a plot showing a variation over time of electromagnetic torque and reference torque.
Figure 8:
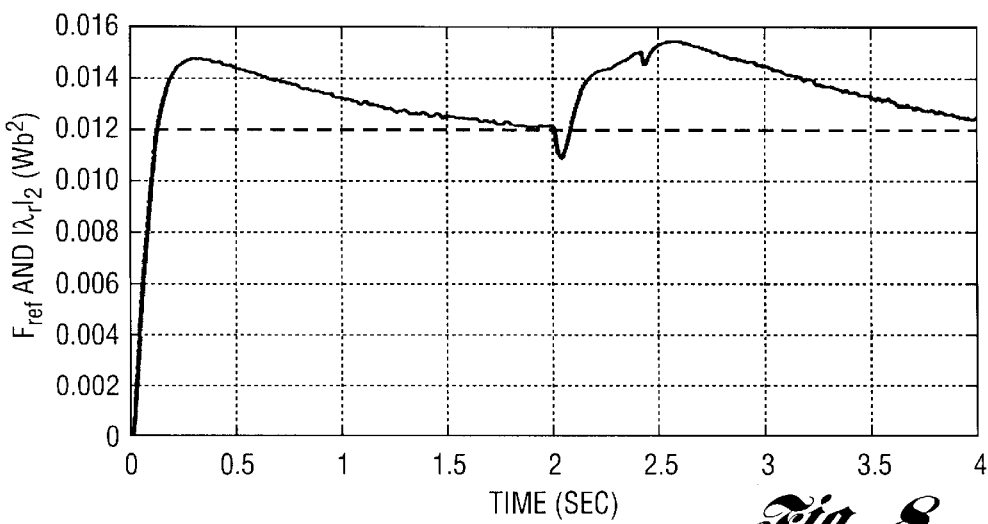
FIG. 8 is a plot showing rotor flux magnitude changes over time in a speed sensorless direct torque and flux control wherein the current is contaminated with noise.
Figure 9:
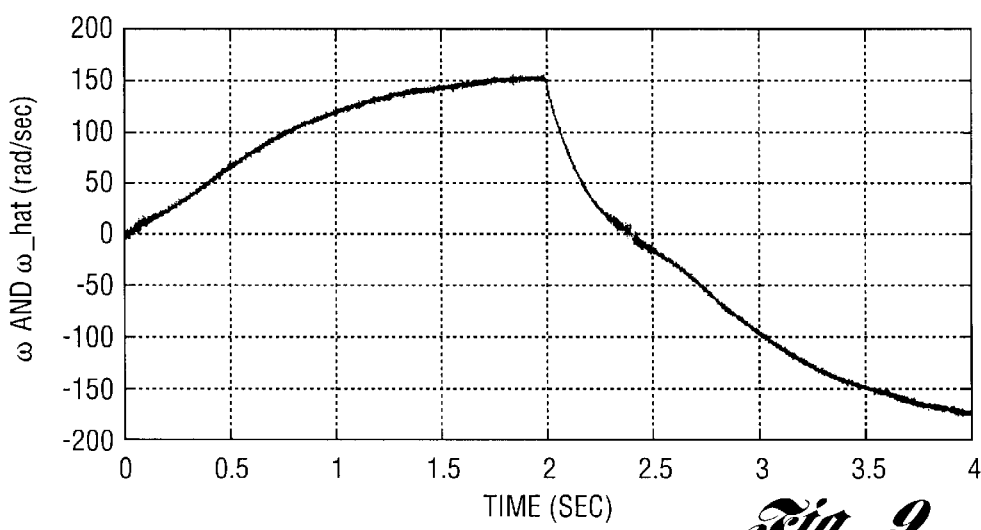
FIG. 9 is a plot showing the rotor speed and its estimated value over time.
Figure 10:
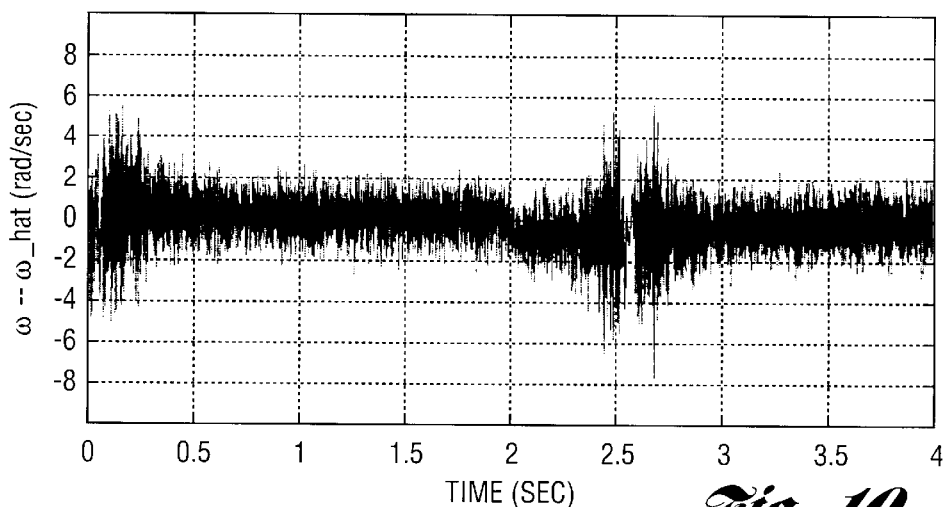
FIG. 10 is a plot of speed estimation error in speed sensorless direct torque and flux control wherein the current is contaminated to a modest extent with noise.

FIG. 2 is a functional schematic system diagram showing an engine 60, which may be a diesel engine, and an induction motor 62 connected to the crankshaft for the engine. A position sensor 64 is used in the experimental setup of FIG. 2. Its signal can be differentiated to obtain a comparison to the results of the calculation using the control method of the invention.

The crankshaft is connected to a load 66 using a clutch 68. The load is simulated by a water brake, as shown.

The electronic engine control for the engine 60 is shown at 70. The controller for the induction motor is shown at 72. For purposes of the experimental setup in FIG. 2, the output of the position sensor would be distributed to the controller.

The state variables in a dynamic model of an induction motor can be expressed as follows:

$$\frac{d\lambda_r}{dt} = \left(-\frac{R_r}{L_r}I + n_p\omega J\right)\lambda_r + \frac{R_r}{L_r}Mi_s \tag{1}$$

$$\frac{di_s}{dt} = -\frac{M}{\sigma L_s L_r}\left(-\frac{R_r}{L_r}I + n_p\omega J\right)\lambda_r - \frac{1}{\sigma L_s}\left(R_s + \frac{M^2 R_r}{L_r^2}\right)i_s + \frac{1}{\sigma L_s}v_s \tag{2}$$

$$\frac{d\Theta}{dt} = \omega \tag{3}$$

$$\frac{d\omega}{dt} = \mu i_s^T J \lambda_r - \frac{\alpha\omega}{m} + \frac{T_L}{m}, \tag{4}$$

$di_s/dt = -M/\sigma L_s L_r(-R_r/L_r I + n_p \omega J)\lambda_r - 1/\sigma L_s(R_s + M^2 R_r/L_r^2)i_s + 1/\sigma L_s v_s$ (2)

$d\Theta/dt = \omega$ (3)

$d\omega/dt = \mu i_s^T J \lambda_r - \alpha\omega/m + T_L/m,$ (4)

where:

$$I = \begin{pmatrix} 1 & 0 \\ 0 & 1 \end{pmatrix}$$

$$J = \begin{pmatrix} 0 & -1 \\ 1 & 0 \end{pmatrix}$$

$\lambda_r$, $i_s$, $v_s$—rotor flux, stator current and stator voltage command $\Theta$—angular position of the rotor $\omega$—angular speed of the rotor $R_r$, $R_s$—rotor and stator resistance M—mutual inductance $L_r$, $L_s$—rotor and stator inductance $\sigma = 1 - M^2/L_s L_r$—leakage parameter $n_p$—number of pole pairs m—moment of inertia of the rotor $\alpha$—damping gain $T_L$—external load torque $\mu = 3n_p M/2L_r$ $T_e = \mu i_s^T J \lambda_r$—the electromagnetic torque.

In practicing the method, the electromagnetic torque is calculated to follow the reference value for torque $T_{ref}$. This is expressed as follows:

$$\lim_{t \to \infty} T_e \to T_{ref} \tag{5}$$

In the calculation of electromagnetic torque, the flux must be kept at a certain level, and the goal is to achieve the following relationship:

$$\lim_{t \to \infty} \lambda_r \to F_{ref}, \tag{6}$$

where $F_{ref}$ is the flux reference value.

It is assumed that the reference values $T_{ref}, F_{ref} \in C^1[R^+]$, and they should be selected while accounting for constraints on the voltage and current signals.

The torque and flux regulation of equations (5) and (6) above is achieved when the rotor speed is measured by using standard indirect field oriented (IFO) control techniques. In an IFO scheme, the electrical excitation frequency $\omega_e^*$ is obtained by summing up the rotor speed signal with the commanded slip frequency $\omega_s^*$. Thus:

$$\omega_e^* = n_p \omega + \omega_s^* \tag{7}$$

where $$\omega_s^* = \frac{2}{3n_p} \frac{T_{ref} R_r}{(F_{ref})^2}. \tag{8}$$

Then, by integrating $\omega_e^*$, the orientation of the frame related with the rotor flux is obtained as a separation of torque and flux tracking is achieved.

In many applications it is desirable to avoid measurements of the rotor position or speed (such sensors make the system expensive and less reliable). Thus the problem of the estimation of the rotor speed from that available for the measurement stator current and stator voltage command arises; i.e., $$\lim_{t \to \infty} \hat{\omega} \to \omega, \tag{9}$$

where $\hat{\omega}$ is a rotor speed estimate.

In direct field oriented (DFO) torque and flux regulation the value of the rotor flux or its estimate is used. The observer for the rotor flux is constructed to achieve the convergence; i.e., $$\lim_{t \to \infty} \hat{\lambda}_r \to \lambda_r, \tag{10}$$

where $\hat{\lambda}_r$ is a rotor flux estimate.

Since parameters of an induction motor may change during its operation and their exact values may be essential for quality of control, the problem of online estimation of the motor parameters arises. In particular, rotor and stator resistances are to be estimated; i.e., $$\lim_{t \to \infty} \hat{P} \to P \tag{11}$$

where $P = [R_r, R_s]^T$ and $\hat{P}$ is its estimate.

For purposes of the invention, estimators for rotor speed and flux are designed only assuming that motor parameters are known or properly estimated.

In order to design a speed observer, an assumption is made that the rotor speed changes significantly slower relative to the rotor flux. Thus the rotor speed can be considered to be a slowly changing unknown parameter so that adaptive identification techniques can be applied.

First, differentiating equation (2) above and eliminating $\lambda_r$, gives:

$$\frac{d^2 i_s}{dt^2} = (\alpha_1 I + \omega \beta_1 J) \frac{d i_s}{dt} + (\alpha_2 I + \omega \beta_2 J) i_s + (\alpha_3 I + \omega \beta_3 J) v_s + \alpha_4 \frac{d v_s}{dt}, \tag{12}$$

where $$\alpha_1 = -\frac{1}{\sigma L_s}\left(R_s + \frac{M^2 R_r}{L_r^2}\right) - \frac{R_r}{L_r}; \quad \beta_1 = n_p;$$

$$\alpha_2 = -\frac{R_r R_s}{\sigma L_r L_s}; \quad \beta_2 = \frac{n_p R_s}{\sigma L_s};$$

$$\alpha_3 = \frac{R_r}{\sigma L_s L_r}; \quad \beta_3 = -\frac{n_p}{\sigma L_s}; \quad \alpha_4 = \frac{1}{\sigma L_s}.$$

Adding $c\, di_s/dt$ for some $c>0$ to both sides of (12) and formally dividing by $(d/dt+c)$ transform equation (12) to $$\frac{d i_s}{dt} = a(t) + \omega b(t) + \varepsilon. \tag{13}$$

Here $\varepsilon \to 0$ exponentially and functions $a(t)$ and $b(t)$ are linear combinations of the filtered stator current and voltage signals $i_{s0}, i_{s1}, v_{s0}, v_{s1}$; i.e., $$a(t) = (c+\alpha_1)i_{s1} + \alpha_2 i_{s0} + \alpha_3 v_{s0} + \alpha_4 v_{s1}, \tag{14}$$

$$b(t) = J(\beta_1 i_{s1} + \beta_2 i_{s0} + \beta_3 v_{s0}), \tag{15}$$

where $$i_{s0} = \frac{1}{s+c} i_s; \quad i_{s1} = \frac{s}{s+c} i_s,$$

$$v_{s0} = \frac{1}{s+c} v_s; \quad v_{s1} = \frac{s}{s+c} v_s,$$

and "s" is a Laplace transform variable.

Equation (13) will be used as a reference model for the rotor speed identification in the frame of the model reference adaptive system approach. The tuning model (stator current observer) is given by the following formula:

$$\frac{d\hat{i}_s}{dt} = a(t) + \hat{\omega}b(t) - L(\hat{i}_s - i_s), \quad L > 0, \quad (16)$$

where $\hat{i}_s$ is the stator current estimate, $\hat{\omega}$ is the rotor speed estimate and L is a positive constant.

Let $e = \hat{i}_s - i_s$, be the stator current estimation error; then the dynamic equation for the error is obtained by subtracting equation (13) from equation (16) as follows:

$$\frac{de}{dt} = -Le + (\hat{\omega} - \omega)b(t) - \varepsilon \quad (17)$$

The speed estimate $\hat{\omega}$ is to be adjusted in such a way as to make the current estimation error and its derivative tend to zero. This implies the convergence to zero of the expression $(\hat{\omega} - \omega)b(t)$. If the identifiability condition $|b(t)| \geq \delta > 0$ holds, then the speed estimate will converge to the actual rotor speed. Such an adjustment is realized by the following equation:

$$\frac{d\hat{\omega}}{dt} = -\lambda e^T b(t), \quad (18)$$

with some positive tuning gain $\lambda > 0$.

The stator current observer of equations (14)–(16), together with the adjustment mechanism of equation (18), constitute the speed observer. Conditions under which the speed identification occurs are given in the following statement:

Consider a dynamic model of an induction motor (1), (2) and the speed observer (14)–(16), (18). Let the stator voltage command $v_s$ be a bounded continuous, piecewise, smooth function. Further, suppose that identifiability condition $$|b(t)| \geq \delta > 0 \quad (19)$$

holds for all $t \geq t_0$ and some $\delta > 0$, $t_0 > 0$.
Then the speed identification occurs as:

$$\lim_{t \to \infty} \hat{\omega}(t) \to \omega.$$

The identifiability condition (19) can be substituted by one of the following equivalent persistent excitation conditions:

1. There exist $\alpha > 0$, $T > 0$, $t_0 > 0$ such that for all $t \geq t_0$ $$\int_t^{t+T} b(s)(b(s))^T \, ds \geq \alpha I.$$

2. There exist $\alpha > 0$, $T > 0$, $t_0 > 0$ such that for all $t \geq t_0$, $\xi \in R^2$ there exist $t^* \epsilon [t, t+T]$ such that $|b(t^*)\xi| \geq \alpha|\xi|$.
3. There exist $C > 0$, $T > 0$, $t_0 > 0$ such that for all $t \geq t_0$ there exist $t_i \epsilon [t, t+T]$, $i=1,2$, such that $[b(t_1), b(t_2)]^{-1} \leq C$.

Note that condition "1" is the definition of persistent excitation of a function b(t).
The identifiability condition (19) is equivalent to the following inequality:

$$\left| \int_0^t e^{-c\tau} \left( \beta_1 \frac{di_s}{dt} + \beta_2 i_s + \beta_3 v_s \right) d\tau \right| \geq \delta.$$

Since $(\beta_1 di_s/dt + \beta_2 i_s + \beta_3 v_s) = \delta \omega_e$, where $\omega_e$ is the electrical excitation frequency, then identifiability condition is violated when $\omega_e$ 0; i.e., the electromagnetic field is not rotating.

Speed estimation law (18) can be substituted by the following sign-adjustment scheme:

$$\frac{d\hat{\omega}}{dt} = -\lambda \text{sign}(e^T b(t)), \quad \lambda > 0. \quad (20)$$

Although its stability is not proved analytically, it shows better performance than (18) in the low-speed region and results in less sensitivity to current noise in the current measurements.

The adaptation algorithms of the gradient type (18) may not be robust with respect to small disturbances. To overcome this problem the robust modifications of (18) with a deadzone or σ-modification are used.

The proof of the condition expressed in equation (18) is based on the Lyapunov function candidate $$V(e, \hat{\omega}, t) = \frac{1}{2} e^2 + \frac{1}{2\lambda} |\hat{\omega} - w|^2 + \int_t^\infty \frac{\varepsilon^2}{4L} ds. \quad (21)$$

The proposed speed observer depends on three parameters (c>0, L>0, λ>0). Their values may substantially influence the observer performance, especially when the speed estimate is used in the closed loop control or the speed changes are fast. In general, increasing the parameter λ improves the estimation convergence, but too high values of λ may cause an overshoot and increase the observer sensitivity to noise. Conversely, very large values of parameters c and L may result in slow convergence. Thus, they should be chosen as rather small values. At the same time if c and L are excessively small, oscillations of the rotor speed estimate with slow attenuation may occur. There is no precise rule for tuning these parameters.

There is always some noise in the stator current measurements. Several methods can be used to lessen the observer sensitivity to noise. The first one would use the adjustment mechanism (20) instead of (18). According to simulation results, the sign-scheme (20) shows better robustness with respect to the current noise. Another way is to filter out the rotor speed estimate (output of the observer) with a low-pass filter. It is also possible to filter out the inputs ($i_s$, $v_s$) using the same filter. One should take into account that parameters of the chosen filter will influence the performance of the observer.

An alternative speed observer using a tuning system of higher order now will be described. In part, the observation scheme is similar to the one described above. The observer utilizes the same methodology of using filtered signals instead of stator current derivatives, and it is also based on the model reference adaptive system approach.

Filtering both sides of equation (12) with a filter 1/(s+c), where c is some positive constant, yields:

$$\frac{di_{sf}}{dt}(\alpha_1 I + \omega \beta_1 J)i_{sf} + (\alpha_2 I + \omega \beta_2 J)i_{s0} + (\alpha_3 I + \omega \beta_3 J)v_{s0} + \alpha_4 v_{sf}. \quad (22)$$

The notations $i_{s0}$, $i_{s1}$, $v_{s0}$, $v_{s1}$ are the same as those used in the previous description of a rotor speed observer. Introducing the new state space vector $z=[i_{s0}{}^T, i_{s1}{}^T]^T$ rewrites (22) in the following state space form:

$$\frac{dz}{dt} = \begin{bmatrix} 0 & I \\ \alpha_2 I + \omega\beta_2 J & \alpha_1 I + \omega\beta_1 J \end{bmatrix} z + \begin{bmatrix} 0 \\ (\alpha_3 + \omega\beta_3 J)v_{s0} + \alpha_4 v_{s1} \end{bmatrix}. \quad (23)$$

Segregating the terms with the unknown rotor speed, the following equation is obtained:

$$\frac{dz}{dt} = Az + \omega g(t) + f(t), \quad (24)$$

where $$A = \begin{bmatrix} 0 & I \\ \alpha_2 I & \alpha_1 I \end{bmatrix}, f(t) = \begin{bmatrix} 0 \\ \alpha_3 v_{s0} + \alpha_4 v_{s1} \end{bmatrix},$$

$$g(t) = \begin{bmatrix} 0 & 0 \\ \beta_2 J & \beta_1 J \end{bmatrix} z + \begin{bmatrix} 0 \\ \beta_3 J v_{s0} \end{bmatrix}.$$

Since $z(t)$, $g(t)$ and $f(t)$ are functions of signals $i_{s0}$, $i_{s1}$, $v_{s0}$ and $v_{s1}$, they may be computed from the measured current and voltage command.

Considering equation (24) as a reference model, the tuning system will be $$\frac{d\hat{z}}{dt} = A\hat{z} + \hat{\omega}g(t) + f(t) - C(\hat{z} - z), \quad (25)$$

where $\hat{z}$ is an estimate of $z$, $\hat{\omega}$ is an estimate of the speed $\omega$ and C is 4×4 matrix such that $\mathcal{A}=A-C$ is Hurwitz.

The equation for the error $e_z=\hat{z}-z$ is:

$$\frac{de_z}{dt} = \mathcal{A} e_z + (\hat{\omega} - \omega)g(t). \quad (26)$$

Let $H=H^T>0$ be a positive definite matrix such that $H\mathcal{A}+\mathcal{A}^T H<0$ will be negative definite. Such H exists since $\mathcal{A}$ is Hurwitz. Then the speed estimation adjustment mechanism is designed according to the following equation:

$$\frac{d\hat{\omega}}{dt} = -\lambda e_z^T H g(t), \lambda > 0. \quad (27)$$

The tuning model equation (25) and the adjustment equation (27) define the speed observer. The convergence conditions for the speed observer (25), (27) are described in the following statement:

Consider a dynamic model of an induction motor (1), (2) and the speed observer (25), (27). Let the stator voltage command $v_s$ be bounded continuous piecewise smooth function. Suppose the identifiability condition $$|g(t)| \geq \delta > 0 \quad (28)$$

holds for all $t \geq t_0$ and some $\delta>0$, $t_0 \geq 0$.

Then the following speed identification occurs:

$$\lim_{t\to\infty} \hat{\omega}(t) \to \omega.$$

The discussion of the first example above regarding the methods for reduction of the sensitivity to noise are also valid for the speed observer of equations (25), (27).

The proof of this second example is based on the Lyapunov function:

$$v(e_z, \hat{\omega}) = \frac{1}{2} e_z^T H e_z + \frac{1}{2\lambda} |\hat{\omega} - \omega|^2.$$

The speed observer (25), (27) utilizes a reference model of higher order, and thus more information about the induction motor dynamics is used in the rotor speed estimate adjustment. The choice of matrices C and H may influence the dynamics of the system. In some cases, the correct choice of these matrices may significantly simplify the whole observer. For example, if $C=A+LI$ and $H=I$ (where $L>0$ is a scalar constant and I is 4×4 identity matrix), then the observer may be reduced to the observer (16), (18) described above.

Transformation of induction motor equations in the earlier discussion can be used to design a new rotor flux observer. Known rotor flux observers utilize natural dynamics of the induction motor and involve integration of flux dynamic equation as follows:

$$\frac{d\hat{\lambda}_r}{dt} = \left(-\frac{R_r}{L_r}I + n_p \omega J\right)\hat{\lambda}_r + \frac{R_r}{L_r} M i_s \quad (29)$$

Using induction motor model (13) makes it unnecessary to integrate in the estimation of the rotor flux with systematic speed errors. If the rotor speed is determined with good accuracy, then equation (13) provides the estimate of the derivative of the stator current. By substituting this estimate into the equation (1), the algebraic equation for the rotor flux is defined.

Combining equations (13) and (2), and moving all the terms except the term with the rotor flux to the right hand side, yields the expression:

$$\frac{M}{\sigma L_s L_r}\left(-\frac{R_r}{L_r}I + n_p \omega J\right)\lambda_r = \quad (30)$$

$$-a(t) - \omega b(t) - \varepsilon - \frac{1}{\sigma L_s}\left(R_s + \frac{M^2 R_r}{L_r^2}\right)i_s + \frac{1}{\sigma L_s} v_s,$$

where $a(t)$ and $b(t)$ are defined in (14) and (15) and $\varepsilon$ tends to zero exponentially.

Neglecting $\varepsilon$ and resolving (30) with respect to the rotor flux, the following formula is obtained:

$$\hat{\lambda}_r = \frac{\sigma L_s L_r}{M(R_r^2/L_r^2 + n_p^2 \hat{\omega}^2)} \quad (31)$$

$$\left(-\frac{R_r}{L_r}I - n_p \hat{\omega} J\right)\left[-a(t) - \hat{\omega}b(t) - \frac{1}{\sigma L_s}\left(R_s + \frac{M^2 R_r}{L_r^2}\right)i_s + \frac{1}{\sigma L_s} v_s\right].$$

If the only information needed from the rotor flux is its orientation, then it is not necessary to calculate the first multiplier in equation (31).

It is important to note that observer (31) does not use integration. It, therefore, is less sensitive to systematic errors in speed estimates.

The rotor speed and flux observers of the invention have been used for sensorless direct torque and flux regulation. The direct torque and flux control scheme, which includes rotor speed and flux observers, is shown in FIG. 1. The speed is estimated by using equations (16) or (18) and rotor flux estimates are obtained from (30) or (31).

An example of motor and controller parameters used in simulations are given in the following table:

TABLE 1

| $R_s$ | $R_r$ | M | $L_{1r}$ | $L_{1s}$ |
|---|---|---|---|---|
| 0.11 | 0.087 | 0.00081 | 0.0011 | 0.0011 |

The speed observer parameters are equal to $\lambda=2000$, L=1000, c=100. The reference torque $T_{ref}$ is a step function changing from 50 N/m to −50 N/m, and the square of the reference flux is $F_{ref}^2=0.012$ Wb$^2$.

In FIGS. 3–6, all motor parameters are known except for the rotor resistance $R_r$ that is increased by 20% over its nominal value. The simulation results with nominal system parameters are not included since they are similar to those in FIGS. 3–6.

In FIGS. 7–10, the stator current is contaminated with a white noise (3 A, 1 kHz frequency) and the rotor speed estimate is filtered with a 100 Hz low-pass filter.

Figure 11:
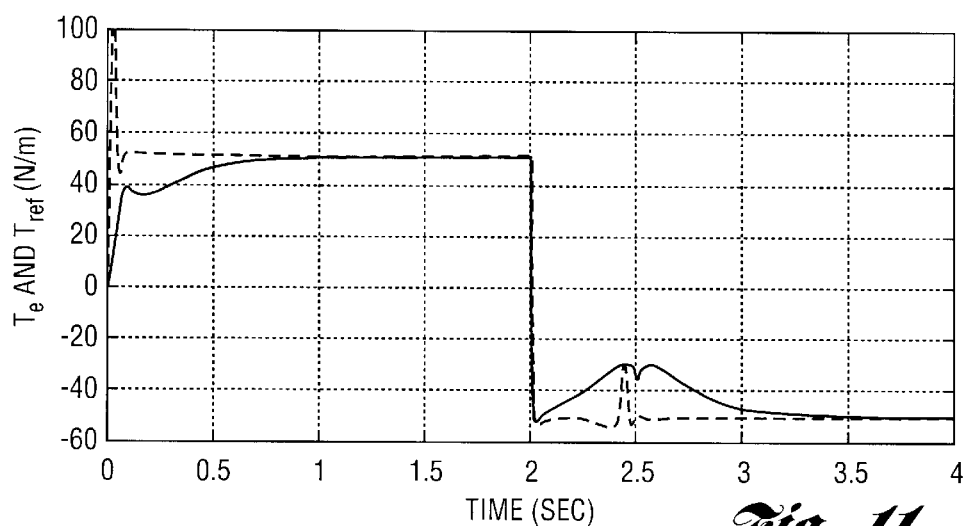
FIG. 11 is a plot of electromagnetic torque and torque corresponding to the flux observer of a typical flux dynamic equation compared to the flux observer that can be obtained using the teachings of the present invention.
Figure 12:
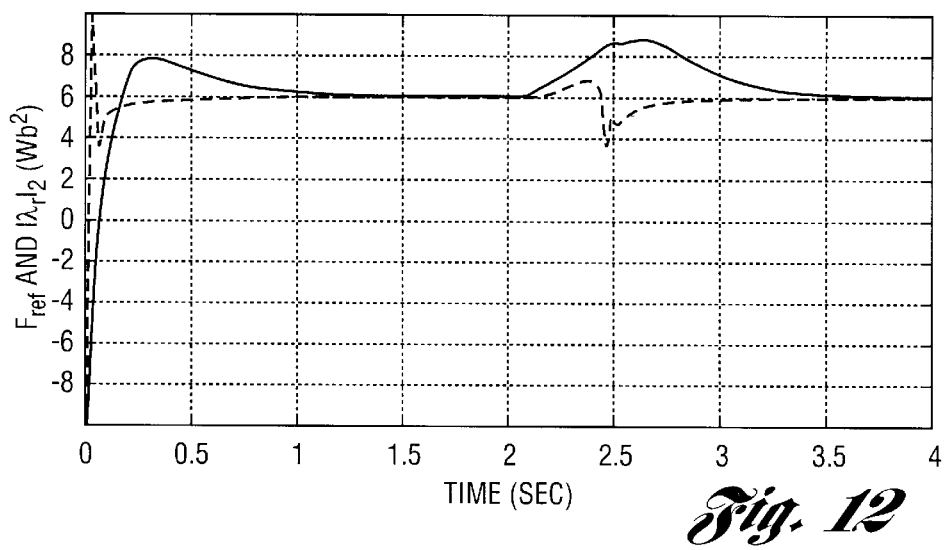
FIG. 12 is a plot of rotor flux showing a reference flux, a flux corresponding to a typical flux dynamic equation, and the flux observer obtained using the teachings of the present invention.
Figure 13:
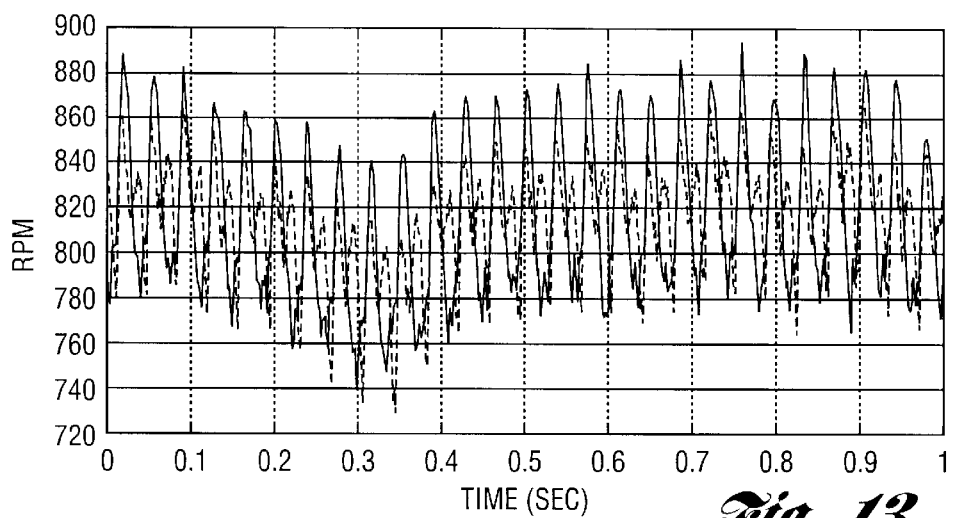
FIG. 13 is a plot showing the rotor speed and its estimated value, one plot being superimposed on the other.
Figure 14:
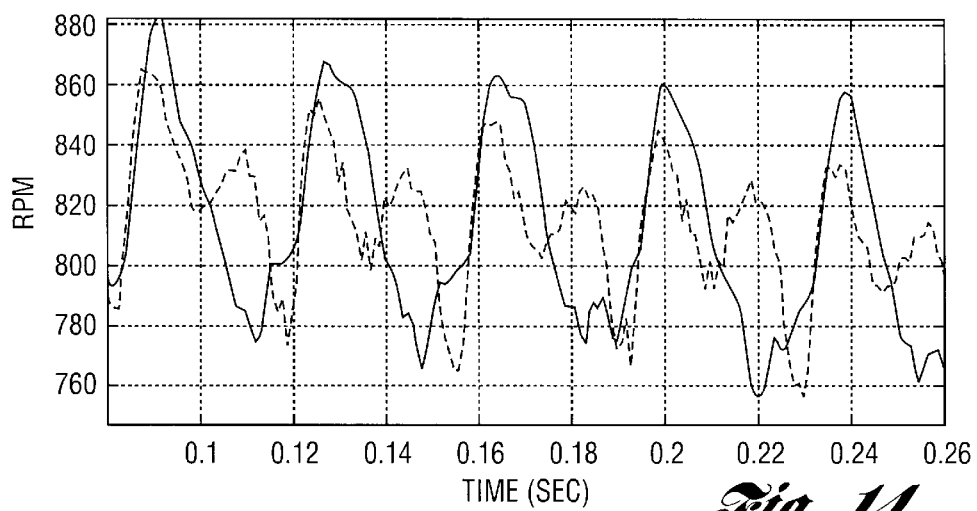
FIG. 14 is a plot showing rotor speed and its estimated value, wherein the relationship between the two variables is enlarged.
Figure 15:
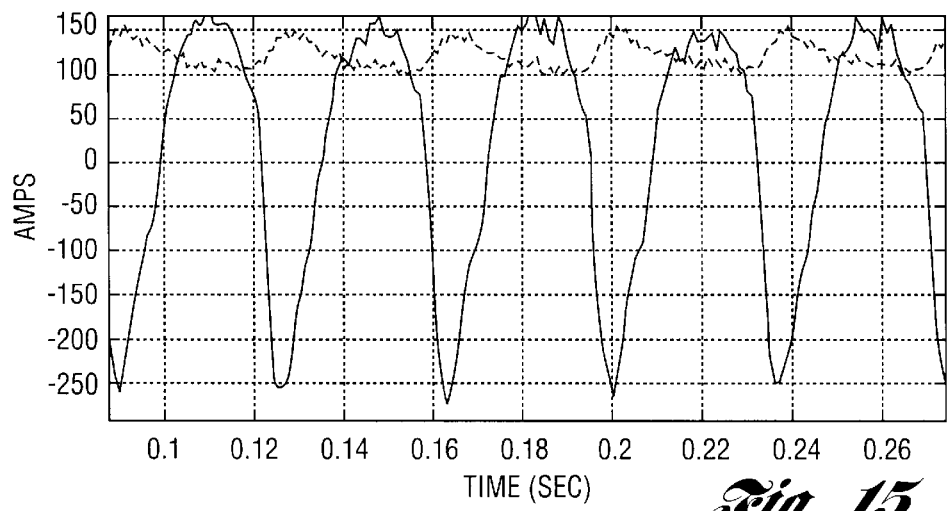
FIG. 15 is a plot showing stator currents over time, the value for a "d" axis component and the reference value for a "q" axis component being compared, their values being determined in accordance with the values being generated by the controller.

FIGS. 11 and 12 give a comparison of the use of rotor flux observers based on the rotor flux dynamic equation (1) and equation (31).

The simulation results show transients in torque and flux tracking during sharp torque changes and when the motor speed crosses zero. As an unexpected positive result of using sensorless control, it should be noted that the scheme is insensitive to rotor resistance variations. Also using the flux observer (31) improves system torque and flux tracking.

The speed observer of the invention has been used for speed sensorless active engine damping. A block diagram of an experimental setup is seen in FIG. 2. It includes an indirect injected diesel engine, mounted on a cart, an 8 kW integrated starter generator (ISG), a clutch, and a water brake to model an external load. This configuration is representative of a hybrid electric vehicle powertrain in which the ISG is used to provide a start stop operation, a power boost, and also to replace a standard passive flywheel function.

The controller ACE is used to control the inverter and communicate with the engine electronic controller (EEC), sensors and an external laptop computer. The controller development and C code generation are performed in the Xmath/SystemBuild graphical environment in a laptop computer.

To make the computation process more efficient, all processes are divided into two classes: slow and fast. The slow processes are implemented in the outer loop with a sampling frequency of 1 kHz, and the fast processes are run with a frequency of 10 kHz in the inner loop. The fast processes include real-time implementation of the indirect field-oriented (IFO) control of the induction motor, and updates of current and speed signals. The speed observer is implemented in the outer loop with a frequency 1 kHz. The observer parameters are selected to be $\lambda=2000$, L=1000, c=100, and they can be tuned in real-time during ISG operation using a communication line between the laptop and ACE.

In the first experiment shown in FIGS. 13–16, a proportional controller is used for the active speed damping. A reference value for the $i_d$ component of the stator current equals to 120 A, and the $i_q$ component is determined according to the reference torque generated by the controller.

Figure 17:
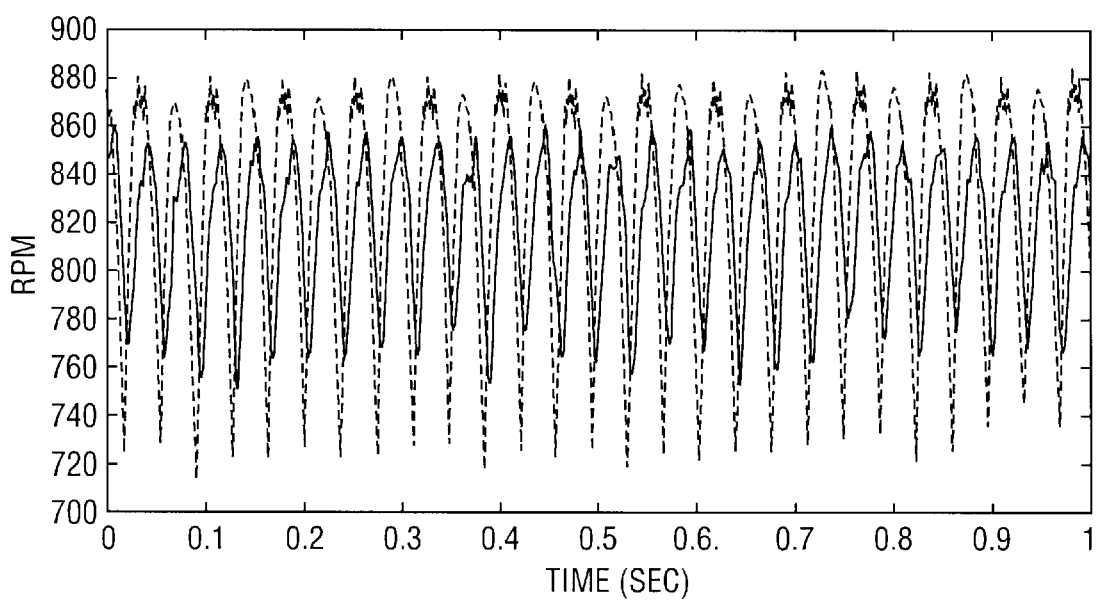
FIG. 17 is a plot over time showing the rotor speed and its estimated value.
Figure 18:
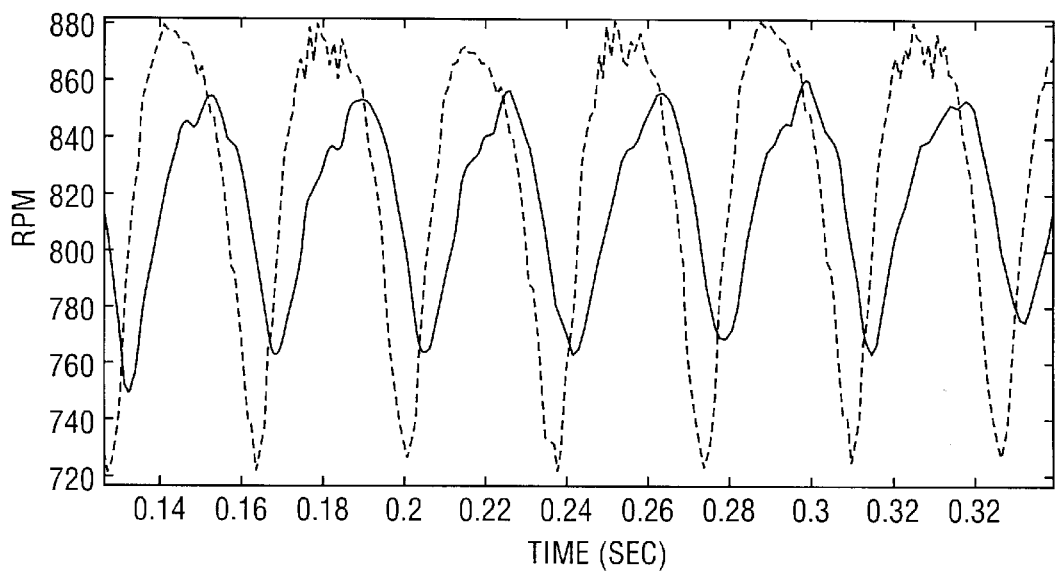
FIG. 18 is a plot similar to FIG. 17 with the scale expanded.
Figure 19:
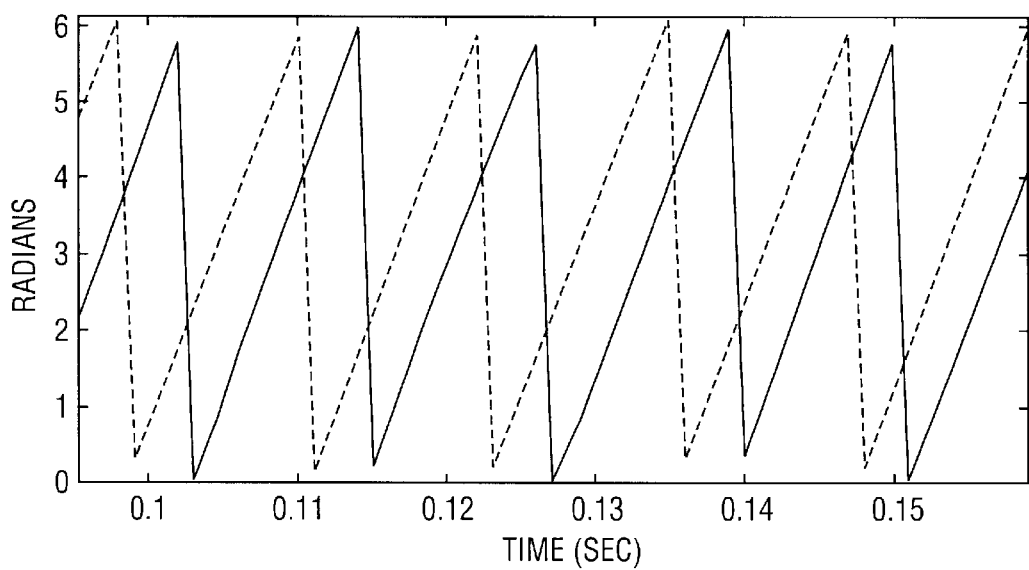
FIG. 19 is a plot of the rotor position angles in an experimental setup similar to the plot of FIG. 16.

In the second experiment shown in FIGS. 17–19, the machine is fluxed, but the active damping controller is off and the torque command equals zero.

Figure 16:
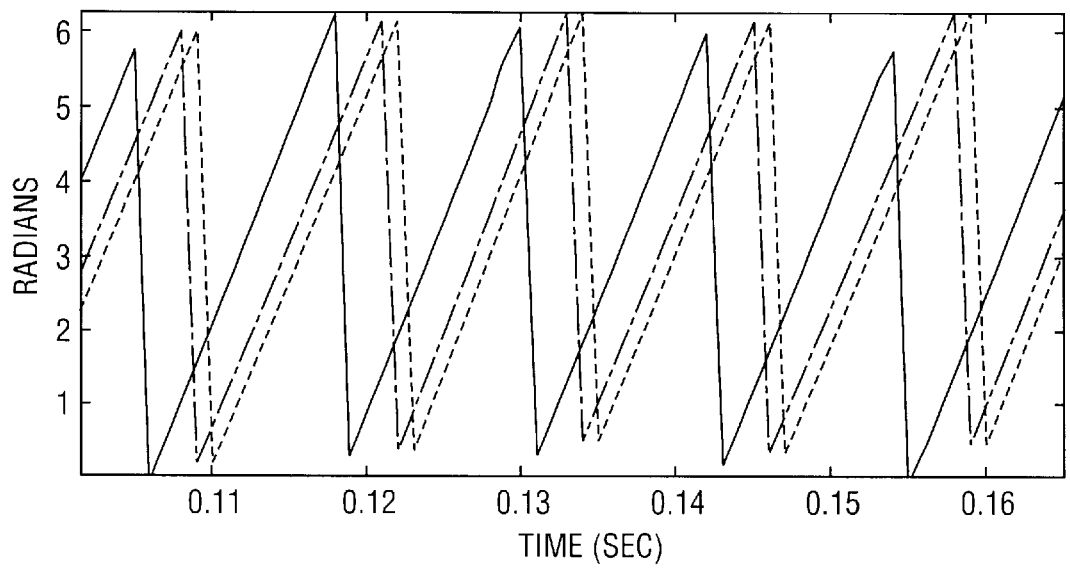
FIG. 16 is a plot of the rotor position angles in an experimental setup, one plot being obtained using the rotor angle obtained from a position sensor, a second plot being the estimate of the angle, and a third plot being the value used by the controller.

FIGS. 16 and 19 show an angular position of the rotor, where $\theta_{sensor}$ (shown by a solid line) is the rotor angle obtained from the sensor, $\theta_{hat}$ (shown by a dash line) is the estimate of the angle and $\theta_{ctr}$ (shown by a dot-dash line) is the value used in IFO control. The difference between $\theta_{hat}$ and $\theta_{ctr}$ is caused by the delay in the data acquisition system. The error between $\theta_{sensor}$ and $\theta_{ctr}$ is constant. That means that the flux converges to the reference value, and thus the field orientation occurs.

Although an embodiment of the invention has been disclosed, modifications may be made by persons skilled in the art without departing from the scope of the invention. All such modifications and equivalents thereof are intended to be covered by the following claims.

What is claimed:

1. A torque control method for a three-phase induction motor wherein the operator commands reference torque and flux values, the motor having a rotor and a stator with windings establishing a rotating flux field, the method comprising the steps of:

measuring three-phase stator current and calculating two-phase stator current from the three-phase stator current;

filtering stator current to develop a high pass filter current output and a low pass filter current output;

calculating stator voltage and filtering calculated stator voltage;

estimating stator current as a function of rotor speed estimation, calculating stator current error and adjusting the estimated rotor speed using stator current error thereby developing an estimation of rotor speed as a function of filtered stator current and filtered stator voltage;

defining a rotor flux observer to calculate a rotor flux estimation and estimating a rotor flux vector;

estimating motor torque using flux orientation and stator current; and calculating stator voltage based on the commanded reference torque, the commanded reference flux, flux estimation, torque estimation and measured stator current.

2. The method set forth in claim 1 wherein the filtered stator current and filtered stator voltage are computed and used to create a reference model for rotor speed estimation;

the estimation of rotor speed comprising calculating the adjustment of estimated rotor speed and the stator current estimate, the rotor speed estimation being used to compute rotor flux angle, and the rotor flux angle being used to control induction motor torque.

3. The method set forth in claim 1 wherein estimation of a rotor flux vector is determined by the equation:

$$\hat{\lambda}_r = \frac{\sigma L_s L_r}{M(R_r^2/L_r^2 + n_p^2 \hat{\omega}^2)}$$

$$\left[\left(-\frac{R_r}{L_r}I - n_p\hat{\omega}J\right)\left[-a(t) - \hat{\omega}b(t) - \frac{1}{\sigma L_s}\left(R_s + \frac{M^2 R_r}{L_r^2}\right)i_s + \frac{1}{\sigma L_s}v_s\right]\right.$$

where:

$$I = \begin{pmatrix} 1 & 0 \\ 0 & 1 \end{pmatrix}$$

$$J = \begin{pmatrix} 0 & -1 \\ 1 & 0 \end{pmatrix}$$

$\hat{\lambda}_r$, $i_s$, $v_s$—rotor flux vector estimate, stator current and stator voltage command ω—angular speed of the rotor $R_r$, $R_s$—rotor and stator resistance M—mutual inductance $L_r$, $L_s$—rotor and stator inductance σ=1-$M^2$/$L_s L_r$—leakage parameter $n_p$—number of pole pairs a(t) and b(t) are linear combinations of the filtered stator current.

4. The method set forth in claim 2 wherein estimation of a rotor flux vector is determined by the equation:

$$\hat{\lambda}_r = \frac{\sigma L_s L_r}{M(R_r^2/L_r^2 + n_p^2 \hat{\omega}^2)}$$

-continued $$\left(-\frac{R_r}{L_r}I - n_p \hat{\omega} J\right)\left[-a(t) - \hat{\omega}b(t) - \frac{1}{\sigma L_s}\left(R_s + \frac{M^2 R_r}{L_r^2}\right)i_s + \frac{1}{\sigma L_s}v_s\right]$$

where:

$$I = \begin{pmatrix} 1 & 0 \\ 0 & 1 \end{pmatrix}$$

$$J = \begin{pmatrix} 0 & -1 \\ 1 & 0 \end{pmatrix}$$

$\hat{\lambda}_r$, $i_s$, $v_s$—rotor flux vector estimate, stator current and stator voltage command ω—angular speed of the rotor $R_r$, $R_s$—rotor and stator resistance M—mutual inductance $L_r$, $L_s$—rotor and stator inductance σ=1-$M^2$/$L_s L_r$—leakage parameter $n_p$—number of pole pairs a(t) and b(t) are linear combinations of the filtered stator current.

* * * * *